(12) United States Patent
Kropf-Eilers et al.

(10) Patent No.: US 7,445,112 B2
(45) Date of Patent: Nov. 4, 2008

(54) CONVEYOR BELT WITH BALL-TYPE REINFORCEMENT ON THE BACKING SIDE

(75) Inventors: Adolfo Kropf-Eilers, Seevetal (DE); Eduard Labus, Stelle (DE)

(73) Assignee: Phoenix Conveyor Belt Systems GmbH, Bas Blankenburg (DE)

( * ) Notice: Subject to any disclaimer, the term of this patent is extended or adjusted under 35 U.S.C. 154(b) by 46 days.

(21) Appl. No.: 10/578,166

(22) PCT Filed: Oct. 13, 2004

(86) PCT No.: PCT/DE2004/002272

§ 371 (c)(1),
(2), (4) Date: May 4, 2006

(87) PCT Pub. No.: WO2005/051808

PCT Pub. Date: Jun. 9, 2005

(65) Prior Publication Data

US 2007/0158168 A1    Jul. 12, 2007

(30) Foreign Application Priority Data

Nov. 19, 2003   (DE)   ................. 103 54 133

(51) Int. Cl.
  *B65G 15/34*   (2006.01)
(52) U.S. Cl. .................... 198/847; 198/844.1
(58) Field of Classification Search .............. 198/844.1, 198/846, 847
See application file for complete search history.

(56) References Cited

U.S. PATENT DOCUMENTS

| | | | | |
|---|---|---|---|---|
| 3,557,931 A * | 1/1971 | Fernandez | ............... | 198/750.7 |
| 3,607,606 A | 9/1971 | Duane | | |
| 3,643,792 A * | 2/1972 | Resener | ....................... | 198/834 |
| 3,880,274 A * | 4/1975 | Bechtloff et al. | .......... | 198/626.2 |
| 4,004,467 A * | 1/1977 | Kenney | ....................... | 198/321 |
| 4,162,900 A | 7/1979 | Judd | | |
| 4,470,500 A * | 9/1984 | Howerton | .................... | 198/847 |
| 4,533,420 A * | 8/1985 | Wetzel | ........................ | 156/138 |
| 5,648,153 A * | 7/1997 | Sinopoli et al. | ........... | 428/295.1 |
| 5,895,138 A * | 4/1999 | Oku et al. | .................... | 396/612 |
| 6,116,411 A | 9/2000 | Reiner et al. | | |
| 6,146,760 A * | 11/2000 | Helfer et al. | ................. | 428/377 |
| 6,209,714 B1 * | 4/2001 | Lapeyre et al. | .............. | 198/779 |
| 6,367,616 B1 * | 4/2002 | Lapeyre et al. | .............. | 198/779 |
| 6,681,922 B2 * | 1/2004 | Corley et al. | ................. | 198/853 |
| 6,705,460 B2 * | 3/2004 | Weiser et al. | ............... | 198/850 |
| 6,974,519 B2 * | 12/2005 | Steinke et al. | ............... | 156/130 |
| 6,986,419 B2 | 1/2006 | Nishikita | | |
| 6,986,420 B2 * | 1/2006 | Weiser et al. | ............... | 198/853 |
| 7,021,454 B2 * | 4/2006 | Ozaki et al. | ................. | 198/779 |
| 7,137,504 B2 * | 11/2006 | Ozaki et al. | ................. | 198/779 |
| 7,216,759 B2 * | 5/2007 | Rau et al. | .................... | 198/853 |
| 7,252,191 B2 * | 8/2007 | Ozaki et al. | ................. | 198/779 |
| 7,322,463 B2 | 1/2008 | Kropf-Eilers et al. | | |
| 2003/0085105 A1 | 5/2003 | Sawa et al. | | |

FOREIGN PATENT DOCUMENTS

| | | |
|---|---|---|
| DE | 33 09 228 | 10/1983 |
| DE | 25 32 190 | 10/1986 |
| DE | 38 02 963 | 8/1988 |
| DE | 37 35 024 | 4/1989 |
| DE | 38 01 120 | 7/1989 |
| JP | 60 000931 | 1/1985 |

* cited by examiner

*Primary Examiner*—James R Bidwell
(74) *Attorney, Agent, or Firm*—Collard & Roe, P.C.

(57) ABSTRACT

The invention relates to a conveyor belt (1) provided with a bearing side (2) and a backing side (3) made of an elastomer material, and a reinforcement carrier (4) embedded therein, wherein the backing side (3) is reinforced with ball-shaped elements (5).

16 Claims, 1 Drawing Sheet

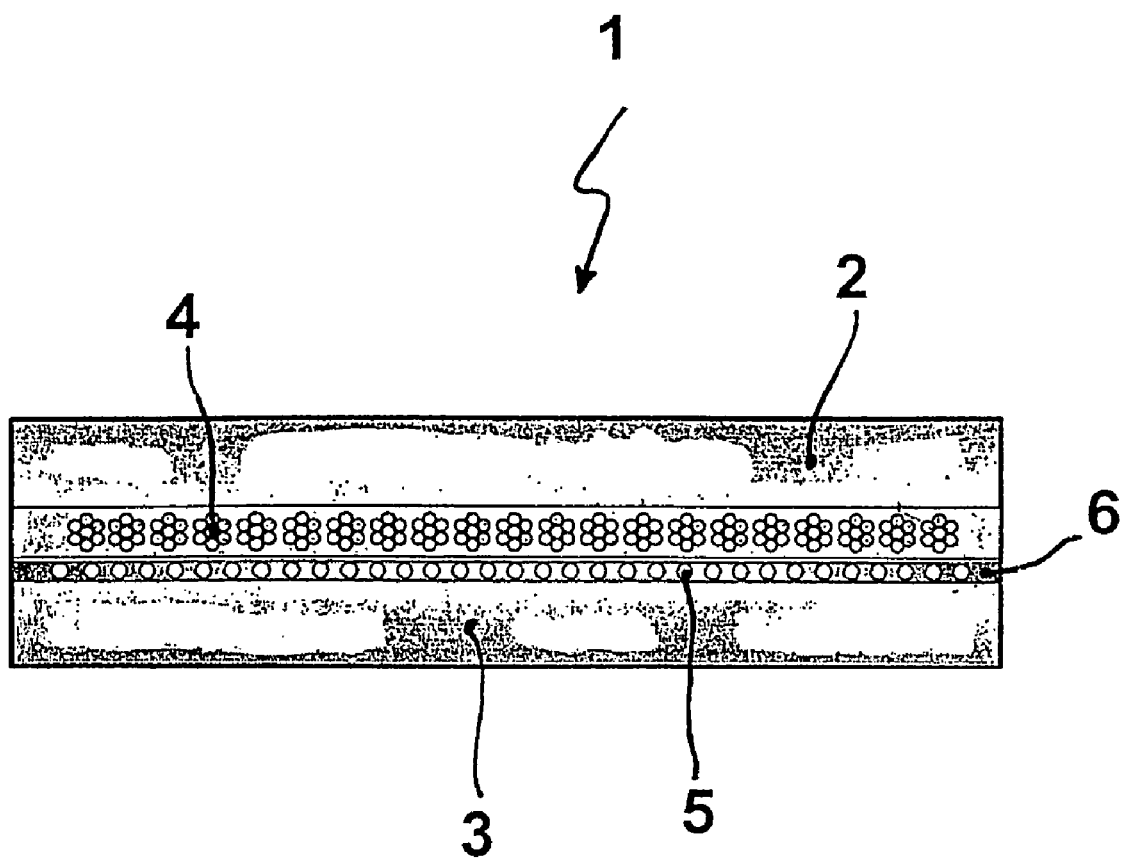

CONVEYOR BELT WITH BALL-TYPE REINFORCEMENT ON THE BACKING SIDE

CROSS REFERENCE TO RELATED APPLICATIONS

Applicants claim priority under 35 U.S.C. §119 of German Application No. 103 54 133.0 filed Nov. 19, 2003. Applicants also claim priority under 35 U.S.C. §365 of PCT/DE2004/002272 filed on Oct. 13, 2004. The international application under PCT article 21(2) was not published in English.

The invention relates to a conveyor belt having a bearing side and a backing side made of elastomer material, as well as an embedded reinforcement carrier, particularly in the form of steel cables or steel cords, or a one-layer or multi-layer reinforcement carrier. In this regard, reference is made to the following prior art, for example: DE 25 32 190 C2, DE 38 01 120 C2, DE 37 35 024 A1, and DE 38 02 963 A1.

Within the scope of a further development, the task consists in making available a conveyor belt having an improved indentation rolling resistance, which therefore results in a lower demand for energy.

This task is accomplished by means of the characterizing part of claim 1, in that the backing side is reinforced with ball-type elements.

Practical embodiments of the invention are indicated in claims 2 to 20.

The invention will now be described on the basis of an exemplary embodiment, making reference to a drawing that shows the cross-section of a conveyor belt.

The conveyor belt 1 comprises a bearing side 2 and a backing side 3, which consist of an elastomer material, in each instance. The conveyor belt furthermore has an embedded reinforcement carrier 4 in the form of steel cables.

The backing side 3 is reinforced with ball-type elements 5 that are disposed within a single layer 6. This layer, in the form of an elastomer matrix, runs close to the reinforcement carrier 4, whereby the ball-type reinforcement extends essentially over the entire width of the conveyor belt. Furthermore, the ball-type elements have essentially the same diameter, whereby the diameter of the ball-type elements corresponds approximately to the layer thickness.

The particular feature of this backing side 3 reinforced by ball-type elements 5 lies in the round surface of the ball-type elements that are introduced, which lead to a lesser indentation rolling resistance. The running properties of the conveyor belt are improved, and this contributes to a reduced demand for energy.

The backing side reinforced with ball-type elements is also referred to as a damping ball-type element mat.

The following tables state the practical diameter and density range of the ball-type elements and the elastomer densities, in Table 1, on the one hand, as well as concrete experimental data within these ranges in Table 2, on the other hand.

TABLE 1

| | Ball-type elements | | Elastomer density |
|---|---|---|---|
| Material | Diameter [mm] | Density [g/cm$^3$] | [g/cm$^3$] (reinforcement layer) |
| Steel | 1-5 | 7.5-8.7 | 1.1-1.6 |
| PUR | 1-5 | 1.18-1.24 | 1.1-1.6 |
| Aluminum | 1-5 | 2.7 | 1.1-1.6 |
| Glass | 1-5 | 2.6 | 1.1-1.6 |
| Lead | 1-5 | 11.4 | 1.1-1.6 |
| POM | 1-5 | 1.41-1.43 | 1.1-1.6 |

TABLE 2

| | Ball-type elements | | Elastomer density |
|---|---|---|---|
| Material | Diameter [mm] | Density [g/cm$^3$] | [g/cm$^3$] (reinforcement layer) |
| Steel | 1 | 8.0 | 1.1 |
| Steel | 5 | 8.0 | 1.1 |
| PUR | 1 | 1.2 | 1.1 |
| PUR | 5 | 1.2 | 1.1 |
| Lead | 5 | 11.4 | 1.1 |
| Lead | 5 | 11.4 | 1.6 |

The thickness of the reinforcement layer corresponded to the diameter of the ball-type elements in all the experiments.

REFERENCE SYMBOL LIST 1 conveyor belt
2 bearing side (cover plate on bearing side)
3 backing side (cover plate on backing side)
4 reinforcement carrier (steel cables)
5 ball-type elements
6 layer of the ball-type elements (reinforcement layer)

The invention claimed is:

1. Conveyor belt (1) having a bearing side (2) and a backing side (3) made of elastomer material, as well as an embedded reinforcement carrier (4), wherein the backing side (3) is reinforced with ball-type elements (5), each ball-type element having a diameter of 1 to 5mm, and wherein the elastomer density of each ball-type element reinforcement is 1.0 to 2.0 g/cm$^3$.

2. Conveyor belt according to claim 1, wherein the ball-type elements (5) are disposed within at least one layer (6).

3. Conveyor belt according to claim 2, wherein the ball-type elements (5) are disposed within a single layer (6).

4. Conveyor belt according to claim 2, wherein the layer(s) (6) is/are disposed close to the reinforcement carrier (4).

5. Conveyor belt according to claim 2, wherein the layer(s) is/are disposed approximately in the center of the backing side (3) with reference to the thickness of the backing side.

6. Conveyor belt according to claim 2, wherein layer(s) is/are disposed close to the surface of the backing side (3) with complete embedding.

7. Conveyor belt according to claim 1, wherein each ball-type element reinforcement extends essentially over the entire width of the conveyor belt.

8. Conveyor belt according to claim 1, wherein each ball-type element reinforcement extends essentially over the entire length of the conveyor belt.

9. Conveyor belt according to claim 1, wherein the ball-type elements (5) are made of plastic.

10. Conveyor belt according to claim 9, wherein the ball-type elements are made of polyurethane (PUR) or polyoxymethylene (POM).

11. Conveyor belt according to claim 1, wherein the ball-type elements (5) are made of glass.

12. Conveyor belt according to claim 1, wherein the ball-type elements (5) are made of a metallic material.

13. Conveyor belt according to claim 12, wherein the ball-type elements (5) are made of a steel that has been hardened throughout, or of aluminum or lead.

14. Conveyor belt according to claim 1, wherein the ball-type elements (5) have essentially the same diameter.

15. Conveyor belt according to claim 1, wherein the diameter of each ball-type element (5) is 3 to 4 mm.

16. Conveyor belt according to claim 1, wherein the elastomer density of each ball-type element reinforcement is 1.1 to 1.6 g/cm$^3$.

* * * * *

UNITED STATES PATENT AND TRADEMARK OFFICE
CERTIFICATE OF CORRECTION

| | |
|---|---|
| PATENT NO. | : 7,445,112 B2 |
| APPLICATION NO. | : 10/578166 |
| DATED | : November 4, 2008 |
| INVENTOR(S) | : Kropf-Eilers et al. |

It is certified that error appears in the above-identified patent and that said Letters Patent is hereby corrected as shown below:

On the Title page, column 1, item [73], please change "Bas Blankenburg" to correctly read:

--Bad Blankenburg--.

Signed and Sealed this

Thirtieth Day of December, 2008

JON W. DUDAS
*Director of the United States Patent and Trademark Office*